(No Model.) 3 Sheets—Sheet 1.
F. J. LOVELL.
HAY AND GRAIN LOADER.

No. 481,699. Patented Aug. 30, 1892.

WITNESSES
Carroll J. Webster
Rolle, Elliott

INVENTOR
Franklin J. Lovell
By Myers & Webster
Attys (No Model.) 3 Sheets—Sheet 2.
F. J. LOVELL.
HAY AND GRAIN LOADER.
No. 481,699. Patented Aug. 30, 1892.
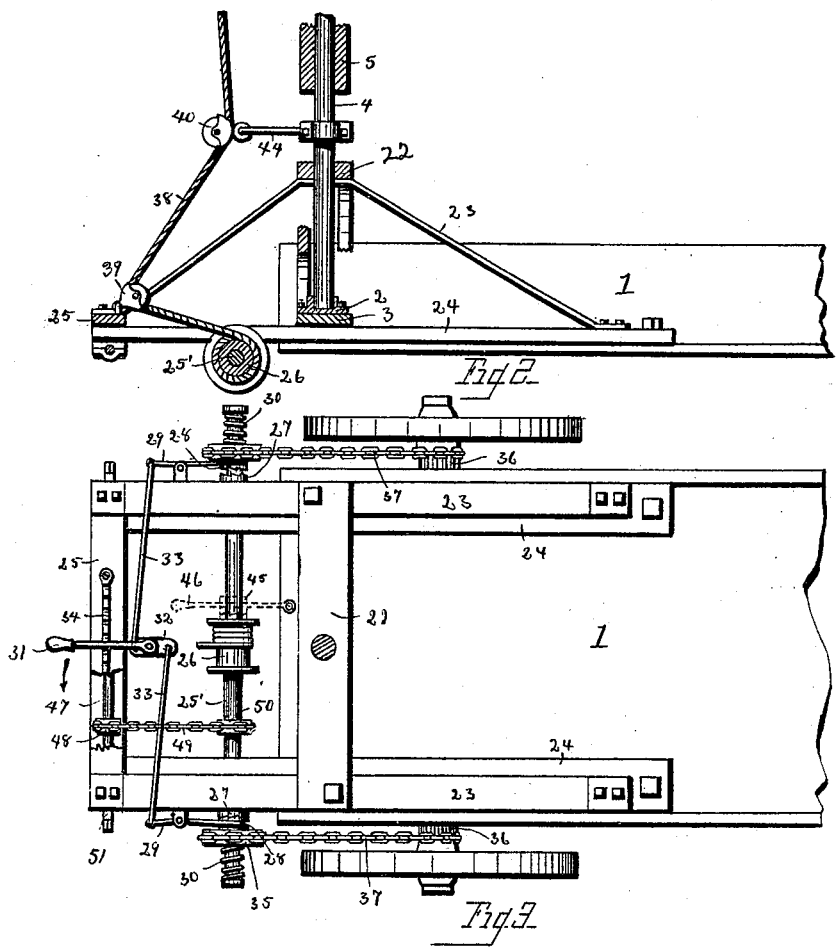

(No Model.) 3 Sheets—Sheet 3.
F. J. LOVELL.
HAY AND GRAIN LOADER.
No. 481,699. Patented Aug. 30, 1892.
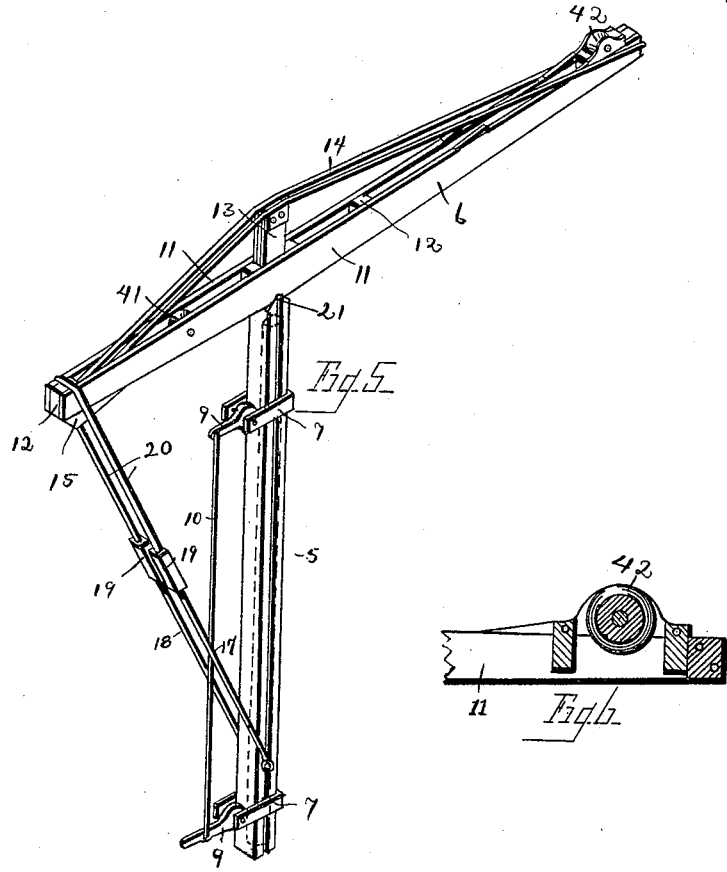
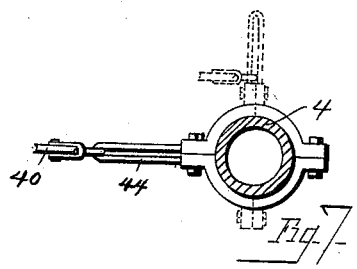
WITNESSES
Carroll J. Webster
Belle Elliott
INVENTOR
Franklin J. Lovell
By Myers & Webster
Attys

UNITED STATES PATENT OFFICE.

FRANKLIN J. LOVELL, OF LITCHFIELD, MICHIGAN.

HAY AND GRAIN LOADER.

SPECIFICATION forming part of Letters Patent No. 481,699, dated August 30, 1892.

Application filed August 7, 1890. Renewed August 17, 1891. Again renewed June 23, 1892. Serial No. 437,690. (No model.)

*To all whom it may concern:*

Be it known that I, FRANKLIN J. LOVELL, of Litchfield, in the county of Hillsdale and State of Michigan, have invented certain new and useful Improvements in a Hay and Grain Loader; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to a hay and grain loader.

The object is to produce a grain-loader the mechanism of which may be actuated either by the running-gear of the wagon or by hand-power to load the bundled grain into the wagon.

A further object is to produce a grain-loader which shall be simple of construction, efficient and durable in use, and which may be manufactured at a nominal sum.

With these objects in view the invention consists in the parts and combination of parts of a hay and grain loader, as will be hereinafter fully described and claimed.

Figure 1:
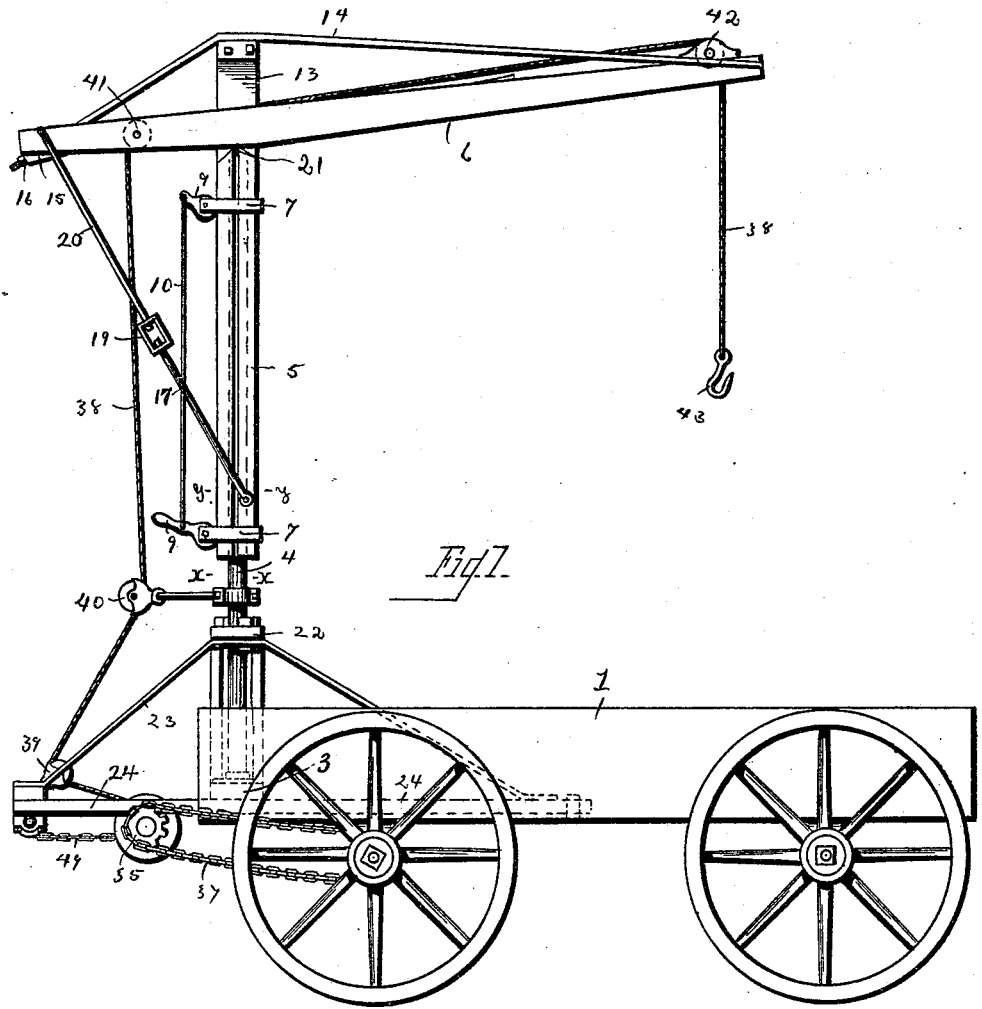
Figure 2:
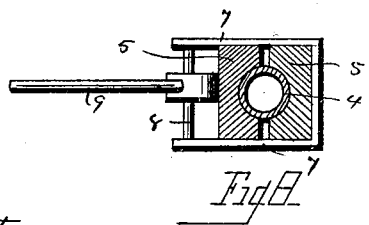

In the drawings, Figure 1 is a side elevation of a wagon, showing the same carrying my improved loader. Fig. 2 is an elevation, partly in section, showing more particularly the manner of securing the standard of the derrick in place, and also the brace-rods for strengthening the same. Fig. 3 is a top plan view of the device, the derrick being removed. Fig. 4 is a rear elevation of the body of the wagon, partly in section, showing the framework for supporting the standard, the boom being removed. Fig. 5 is a detail perspective view of the derrick removed from the wagon, showing its peculiar construction. Fig. 6 is a detail view of the end of the boom, showing the pulley journaled therein. Fig. 7 is a horizontal sectional view taken on the line $x\, x$, Fig. 1; and Fig. 8 is a similar view taken on the line $y\, y$ of Fig. 1.

Referring to the drawings, 1 designates the body of a wagon, which may be of any preferred form. Within the rear part of the said body and mounted in a socket 2 on a cross-piece 3 is a tubular standard 4, which forms the pivot for a hollow sleeve 5, upon the upper end of which is pivoted a boom 6. The sleeve 5 is preferably square in cross-section and formed of two sections, as shown in Fig. 8, which are held together in any suitable manner. At points preferably near the top and bottom of the said sleeve are secured straps 7, the ends of which extend beyond the face of the sleeve and form bearings for axles 8, on which are rigidly secured cam-levers 9, adapted to compress the two sections of the sleeve and thus clamp them securely against the standard 4, whereby the sleeve, and with it the boom 6, may be raised to any desired point and clamped in that position. The two cam-levers are connected by a rod 10, thus admitting of both being operated in unison.

The boom 6, to which reference has been made, consists of two parallel beams 11, which are held at a proper distance apart by means of blocks 12. At a point to one side of the center of the boom is secured a standard 13, over which passes truss-rods 14, passing around the outer end of the boom and through a block 15 in the opposite end of the boom, at which point it is secured by means of nuts 16. These truss-rods are designed to compensate for the vertical strain to which the boom is subjected in lifting heavy bundles of grain.

In order to prevent the boom from tipping, guy-rods 17 and 18 are employed, which connect at their lower ends with the sleeve 5 and at their upper ends by means of turn-buckles 19 with a U-shaped rod 20, that extends over the inner end of the boom. These turn-buckles perform a double function—that of forming a connection between the guys and rod 20 and also, of admitting the outer end of the boom being elevated or depressed, whereby the point of strain may be changed, thus relieving the boom from undue strain.

Instead of pivoting the boom to the sleeve in the ordinary manner, a knife-edge bearing 21 is employed which will allow the boom to rock thereon, so as to admit of the adjustment referred to.

The lower end of the standard 4 is braced by a cross-piece 22, in which it revolves, the latter cross-piece being braced by rods 23, connecting, respectively, with longitudinal beams 24 and a cross-beam 25, carried by the latter, which beams 24 support the elevating mechanism, which will now be described. The beams 24 extend out beyond the end of the wagon-body and form bearings for a shaft 25', carrying a drum 26. Each end of the shaft carries a stationary clutch-section 27, adapted to be engaged by a movable clutch-section 28, which latter is thrown into or out of operative position by shifting-rods 29, springs 30 serving to keep the clutch-sections in normal contact with each other. In order to throw the two clutches out of operative position in unison, a lever 31 is employed, carrying on one end a plate 32, which connects by means of rods 33 with the shifting-rods 29. It will be seen that when the lever 31 is turned in the direction indicated by the arrow the clutch-sections will be drawn apart, in which position they are held by means of a rack-plate 34, with which the lever 31 engages. The shaft 25' also carries sprocket-wheels 35, which take motion from sprocket-wheels 36 on the hubs of the hind wheels by means of a sprocket-chain 37. Connecting with the drum is a rope 38, which passes through blocks 39 and 40 and thence over pulleys 41 and 42, mounted in the boom, and carries at its end a hook 43, which engages the binder of the bundle to be elevated. The block 40 has a link connection with a U-shaped arm 44, rigidly secured to the standard 4, and is designed to slide on the arm as the boom is moved, as shown in full and dotted lines in Fig. 7, the full lines showing the normal position of the said block and the dotted lines the position it occupies when the boom is swung out to lift a bundle. The object of this block is to cause the boom automatically to swing over the wagon-body when lifting a bundle, in contradistinction to employing a rope for that purpose, as is necessary in derricks of the ordinary construction. This feature will be readily understood, for it will be seen that as the boom is turned to one side so as to allow the hook 43 to engage with a bundle the arm 44 will be turned to the position shown in Fig. 7—that is, at right angles to its normal position—while the block will retain the same position, as shown in dotted lines in the above-named figure. It thus follows that the rope is put under great lateral strain when the bundle is being lifted and that as soon as the bundle has cleared the sides of the wagon the boom will be swung around without any other mechanism than the rope.

Should it be desired to operate the lifting mechanism by hand, the clutches and mechanism for shifting the same, to which reference has been made, are dispensed with, and instead of having the drum rigidly mounted upon the shaft it will be loosely mounted and will be engaged by a clutch 45, which will be splined upon the drum-shaft and actuated by means of a shifting-lever 46. A shaft 47 is provided carrying a sprocket-wheel 48, which imparts motion to the drum-shaft through the medium of a sprocket-chain 49, which engages a sprocket-wheel 50 on the said drum-shaft, motion being imparted to the shaft 48 by means of a crank which is adapted to engage the squared end 51 of the said shaft.

From the foregoing description, taken in connection with the drawings, the operation of my improved loader will be readily understood. It will be seen that the forward movement of the wagon can be utilized to operate the elevating mechanism, and that by reason of the peculiar arrangement of the block through which the hoisting-rope extends the boom will be automatically brought to a position requisite to discharge the bundle into the wagon. I have shown in this instance the beams 24 held in place in the wagon-body by means of bolts; but, if desired, I may provide a series of staples through which the said beams may extend, thus doing away with the bolts and rendering the removal from the wagon-body of the elevating mechanism an easy matter.

Having thus fully described my invention, what I claim as new, and desire to secure by Letters Patent, is—

1. In a hay and grain loader, the combination of a tubular upright movably secured within the wagon-body, a sectional sleeve embracing said upright and carrying a boom, and clamps carried by the sleeve to hold the same at any desired height on the upright.

2. In a hay and grain loader, the combination of an upright rotatably mounted upon the wagon-body, a sectional sleeve carrying clamping devices embracing the said upright, a boom pivoted upon the said sleeve, and adjustable guy-rods connecting the sleeve and boom.

3. In a hay and grain loader, the combination of an upright rotatably mounted upon the wagon-body, a sleeve embracing the said upright, having a knife-edge bearing, a boom engaging the said bearing, and adjustable guy-rods connecting the sleeve and boom.

4. In a hay and grain loader, the combination of a standard rotatably mounted upon the wagon-body, an arm rigidly secured thereto, a block having a sliding connection with said arm, a sleeve carried by the upright, a boom carried by the sleeve, and a rope extending from the boom to a suitable elevating mechanism and extending through the said block.

In testimony that I claim the foregoing as my own I hereby affix my signature in presence of two witnesses.

FRANKLIN J. LOVELL.

Witnesses:
WM. WICKMAN,
G. C. HANKHAUER.